A. WICHERTJES.
POTATO DIGGING MACHINE.
APPLICATION FILED OCT. 25, 1909.
987,202.
Patented Mar. 21, 1911.
2 SHEETS—SHEET 1.
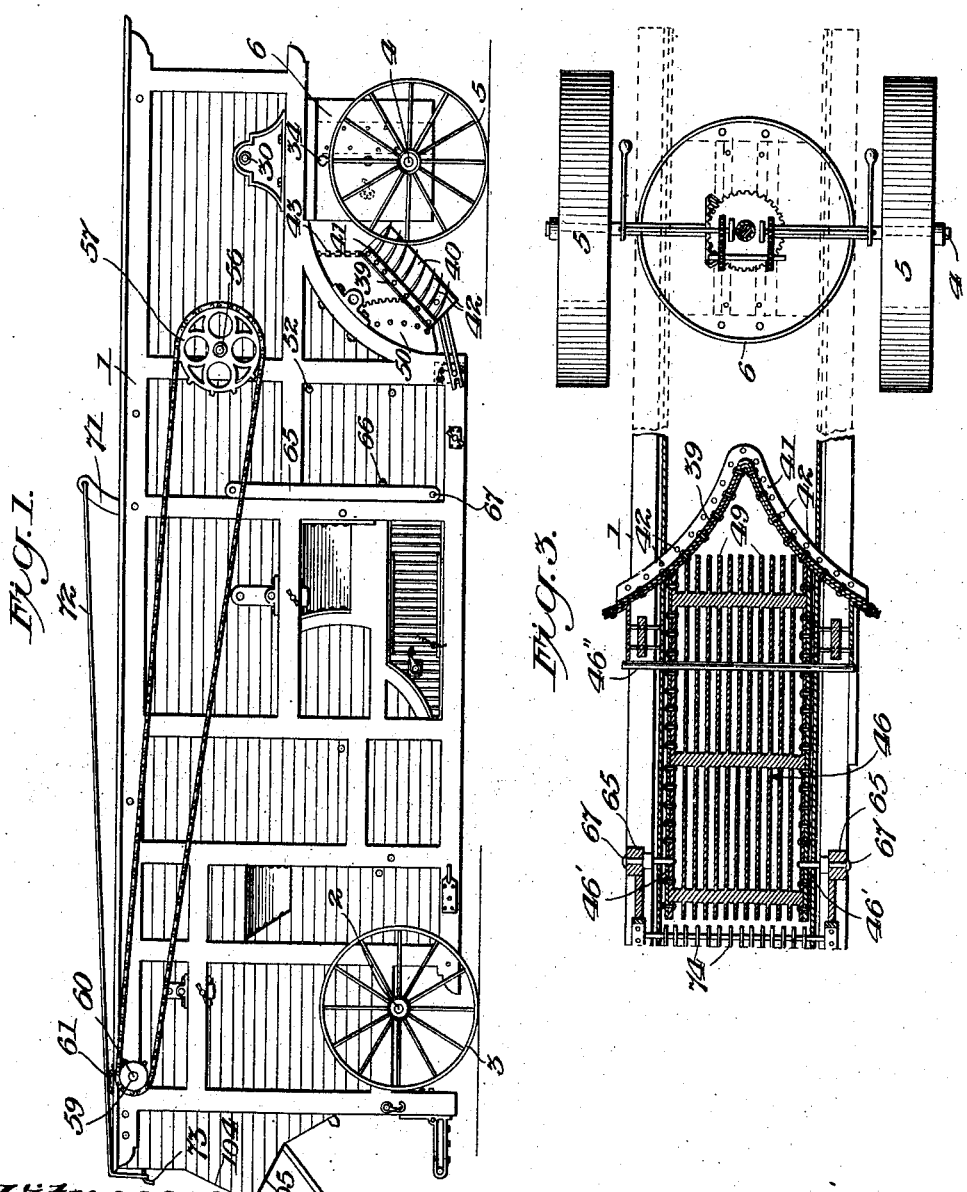

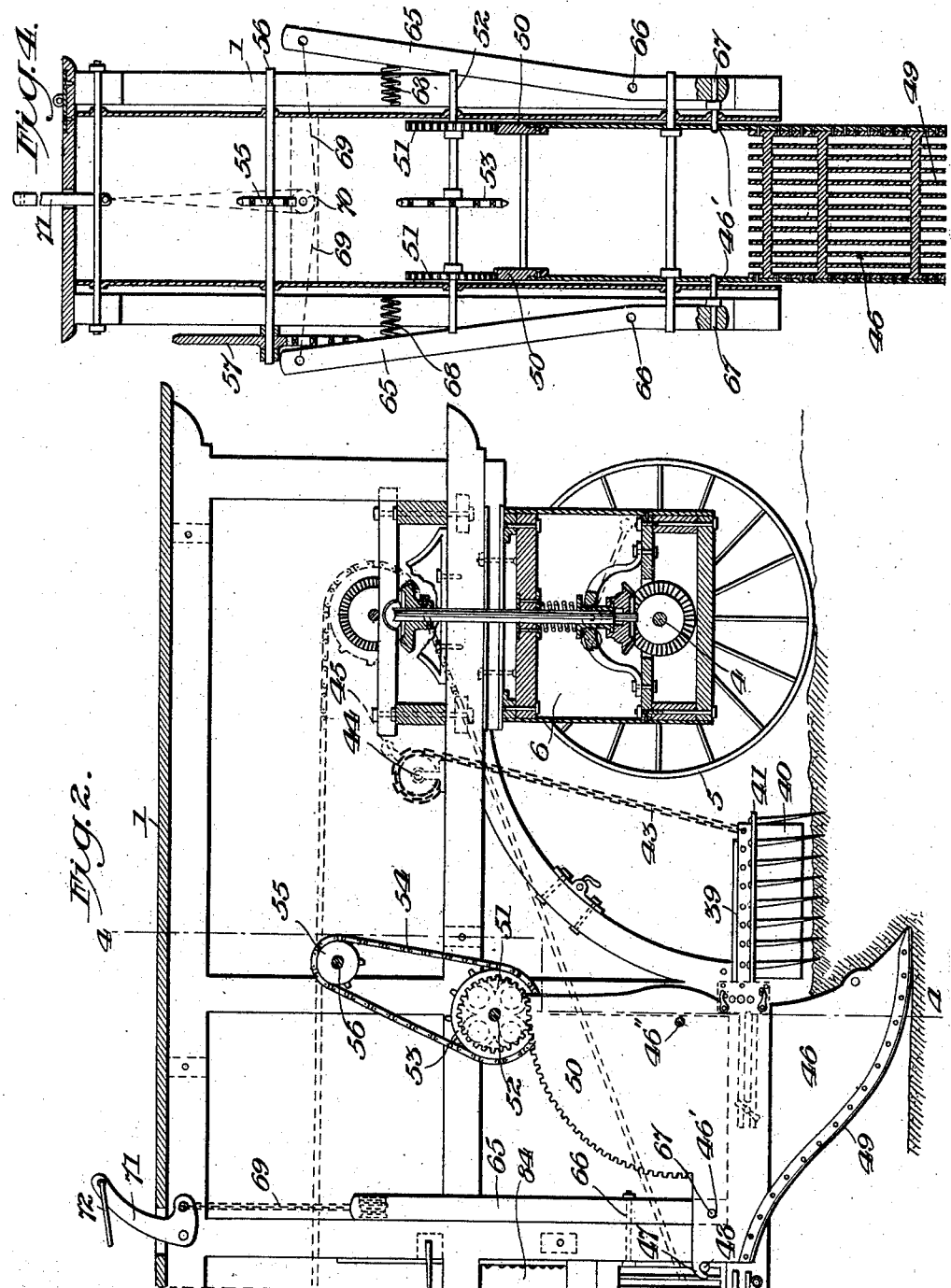

UNITED STATES PATENT OFFICE.

AREND WICHERTJES, OF CHICAGO, ILLINOIS.

POTATO-DIGGING MACHINE.

987,202. Specification of Letters Patent. Patented Mar. 21, 1911.

Application filed October 25, 1909. Serial No. 524,475.

*To all whom it may concern:*

Be it known that I, AREND WICHERTJES, a citizen of the United States, residing at Chicago, in the county of Cook and State of Illinois, have invented a new and useful Improvement in Potato-Digging Machines, of which the following is a specification.

An object of the invention is to provide a machine which is exceedingly simple and cheap in construction and one in which the parts are so mounted and connected together that all danger of the machine getting out of order in operation is prevented.

Another object of the invention is to provide a machine which is provided with means for removing the roots, weeds and other debris in advance of the digging mechanism so that the potatoes will be carried into the machine fairly free from extraneous matter, save such dirt as may adhere to them.

A still further object of the invention is to provide novel means for raising and lowering the plow together with means for locking the same in inoperative position.

A further object of the invention is to provide a machine which is so constructed that all danger of the plow becoming choked is prevented.

With these various objects in view, my invention consists of the novel features of construction, combination and arrangement of parts hereinafter fully described, pointed out in the claims and shown in the accompanying drawings, in which, Figure 1 is a side elevation of my improved digging machine, showing the parts in a raised position so that the machine can be moved over a road without any danger of injuring any of the parts. Fig. 2 is a vertical longitudinal section through the front portion of my improved potato digging machine. Fig. 3 is a horizontal longitudinal section through the front portion of the machine. Fig. 4 is a section taken on line 4—4 of Fig. 2 looking toward the rear.

In carrying out my improved invention I employ a body 1 mounted on a rear axle 2 provided with wheels 3 and a front axle 4 provided with wheels 5.

Slidably and pivotally mounted to the rear of the axle 4 is a root removing device 39 which comprises a V-shaped plow portion 40 having a flange 41 at its upper edge which is provided with a series of cutting teeth 42 adapted to cut and remove the roots from the ground and as they are drawn to the surface they are picked up by the plow 40 and carried out to each side of the machine as clearly shown. For raising the root removing device 39 I connect a chain 43 at the point of the plow as clearly shown which extends upwardly and is connected to a shaft 44 which is provided with a crank 45 for operating the same, said shaft being locked by a pawl and ratchet mechanism not shown.

Pivoted in the body 1 upon a shaft 46″, to the rear of the root removing device 39 is a plow 46 which is provided with hook-shaped bearing portions 47 pivotally mounted on stud pins 48 extending inwardly from the sides of the body as clearly shown, said plow being provided with a slat or grate bottom 49, whereby the potatoes will be removed from the hills with a very small portion of dirt. The plow 46 is provided with segmental rack side portions 50 adapted to be engaged by gears 51 mounted on a transverse shaft 52 extending through the body 1 which is provided with a central sprocket wheel 53 over which passes a sprocket chain 54, which passes over a sprocket 55 mounted on a transverse shaft 56 extending through the body, which is provided with a sprocket wheel 57 at one end over which passes a sprocket chain 58 which extends rearwardly and passes over a sprocket wheel 59 mounted on a transverse shaft 60 extending through the body adjacent its top at its rear end. Any preferred means may be employed for rotating the shaft 60 and while I have failed to show any means for locking this shaft, it is of course understood that the same can be provided with a pawl and ratchet mechanism or any other means.

For locking the plow in an operative position so as to hold the same firmly I pivotally mount upon opposite sides of the body 1 levers 65 upon bolts 66, said levers being provided with pins 67 at their lower ends which are slightly off-set as clearly shown, said pins extending through openings formed in the sides of the body and adapted to fit within openings 46′ formed in the sides of the plow 46 so that it will be impossible for the plow to move in any way. The levers are forced outwardly at their upper ends so as to hold the pins in the openings of the plow by coiled springs 68 so that in order to release the plow so that the same can be raised it is necessary to compress the levers against the tension of the springs. For operating the levers I provide cables 69 which are connected to the ends of the levers and pass over pulleys 70 and have their ends connected to a bell crank lever 71 which is operated by a rod 72 extending rearwardly which is fastened by a hook 73 and it will be seen that by this construction when the rod is drawn rearwardly so as to swing the crank 71 the cables will be drawn upwardly so as to draw the ends of the levers against the sides of the body which will throw the pins out of engagement with the plow.

The operation of the construction shown is as follows: The plow may be adjusted to enter the ground the desired depth by releasing the locking levers 65 and rotating the shaft 60 in the direction to turn the point of the plow into the ground. The root removing device may then be adjusted to the desired height to remove the roots, weeds and the like from the surface of the ground in front of the plow.

While I have shown but one specific embodiment of the invention it will be understood that many details of the construction shown may be altered or omitted without departing from the scope of the claims.

What I claim is:—

1. A potato digging machine comprising a wheeled body, a plow pivotally mounted in said body provided with a segmental gear portion, a gear meshing with said segmental gear portion, means for operating said gear and locking levers mounted on said body for engaging said plow.

2. A potato digging machine comprising a wheeled body, a plow pivotally mounted in said body provided with a grate bottom, and having openings in its side portions, means for swinging said plow, spring actuated levers mounted on the sides of said plow and adapted to engage said openings, and means for operating said levers.

3. A potato digging machine, comprising a wheeled body, a plow pivotally mounted in said body, a segment gear on each side of the plow, means coöperating with said gear to raise and lower the plow, locking levers pivoted on the side of the body and adapted to lock the plow in adjusted position, and means adapted to release said levers.

4. A potato digging machine, comprising a wheeled body, a plow pivotally mounted in the body and having a grate bottom, segment gears mounted one on each side of the plow, means coacting with said gears to raise and lower the plow, supporting hooks on the rear end of the plow, levers pivoted on the sides of the body and adapted to lock the plow in operative position, and means for simultaneously releasing said levers.

5. A potato digging machine, comprising a wheeled body, a plow pivotally mounted in the body, a segment gear on each side of the plow, mechanism connected with said gears and adapted to raise and lower the plow, locking levers pivoted on the sides of the body and adapted to lock the plow in adjusted position, a bell crank lever pivoted on the body, flexible connections between said bell crank lever and the locking levers, and a root remover adjustably mounted on the body in front of the plow and adapted to clear the ground in front of the plow.

6. In a potato digging machine the combination with a wheeled body, of a plow pivotally mounted in said body provided with a segmental gear portion and having openings in its sides, a gear meshing with said segmental gear, a crank for operating said gear through the medium of sprocket chains and gears, spring actuated levers carrying pins adapted to work in the openings of said plow and a bell crank lever carrying cables passing over pulleys connected to the upper ends of said levers for throwing said pins out of engagement with said plow.

7. In a potato digging machine the combination with a pivotally mounted plow having a grate bottom and provided with a segmental gear portion, a transverse shaft arranged above said plow carrying a gear meshing with the segmental gear, a sprocket carried by said shaft, a second transverse shaft arranged above the first mentioned shaft carrying a sprocket, a chain passing over said sprockets, and means for operating the last named shaft to raise or lower the plow.

8. A potato digging machine, comprising a wheeled body, a plow pivotally mounted in the body, and a root removing device slidably and pivotally mounted in front of the plow, and comprising a V shaped plow, and cutting teeth extending downwardly from the V shaped plow.

9. A potato digging machine, comprising a wheeled body, a plow pivotally mounted in the body, a V shaped plow slidably and pivotally mounted on the body in front of the plow, a plurality of teeth extending downwardly beneath the V shaped plow, and means connected with the point of the V shaped plow for raising and lowering the same.

AREND WICHERTJES.

Witnesses:
 SIMON FIET,
 PETER M. WILTJER.